(12) United States Patent
Hong et al.

(10) Patent No.: US 7,113,689 B2
(45) Date of Patent: Sep. 26, 2006

(54) MICROELECTROMECHANICAL SYSTEMS (MEMS) VARIABLE OPTICAL ATTENUATOR

(75) Inventors: Yoon Shik Hong, Kyungki-do (KR); Young Gyu Lee, Kyungki-do (KR); Sung Cheon Jung, Kyungki-do (KR); Sang Kee Yoon, Kyungki-do (KR); Hyun Kee Lee, Kyungki-do (KR); Suk Kee Hong, Seoul (KR); Joon Seok Kang, Kyungki-do (KR); Jung Hyun Lee, Kyungki-do (KR)

(73) Assignee: Samsung Electro-Mechanics Co., LTD, Kyungki-do (KR)

(*) Notice: Subject to any disclaimer, the term of this patent is extended or adjusted under 35 U.S.C. 154(b) by 290 days.

(21) Appl. No.: 10/606,348

(22) Filed: Jun. 26, 2003

(65) Prior Publication Data

US 2004/0126080 A1   Jul. 1, 2004

(30) Foreign Application Priority Data

Dec. 27, 2002   (KR) .................. 10-2002-0084702

(51) Int. Cl.
G02B 6/00     (2006.01)

(52) U.S. Cl. .................. 385/140; 385/19; 359/227

(58) Field of Classification Search ............... 385/140, 385/140.19
See application file for complete search history.

(56) References Cited

U.S. PATENT DOCUMENTS

| | | | |
|---|---|---|---|
| 4,828,345 A * | 5/1989 | Kitamura et al. | 359/360 |
| 5,208,880 A * | 5/1993 | Riza et al. | 385/18 |
| 5,923,798 A * | 7/1999 | Aksyuk et al. | 385/19 |
| 6,108,466 A * | 8/2000 | Aksyuk et al. | 385/19 |
| 6,173,105 B1 * | 1/2001 | Aksyuk et al. | 385/140 |
| 6,222,656 B1 | 4/2001 | Eu | |
| 6,229,640 B1 * | 5/2001 | Zhang | 359/290 |
| 6,351,580 B1 * | 2/2002 | Dhuler et al. | 385/19 |
| 6,388,359 B1 * | 5/2002 | Duelli et al. | 310/309 |
| 6,459,845 B1 * | 10/2002 | Lee et al. | 385/140 |
| 6,751,392 B1 * | 6/2004 | Szilagyi et al. | 385/134 |
| 6,775,459 B1 * | 8/2004 | Hong et al. | 385/140 |
| 2002/0061179 A1 * | 5/2002 | Morimoto et al. | 385/140 |
| 2003/0063891 A1 * | 4/2003 | Kim | 385/140 |
| 2004/0126081 A1 * | 7/2004 | Hong et al. | 385/140 |

* cited by examiner

*Primary Examiner*—Ellen E. Kim
(74) *Attorney, Agent, or Firm*—Lowe Hauptman & Berner, LLP

(57) ABSTRACT

An MEMS variable optical attenuator includes a substrate having a planar surface, a micro-electric actuator arranged on the planar surface of the substrate, a pair of coaxially aligned optical waveguides having a receiving end and a transmitting end, respectively, and an optical shutter movable to a predetermined position between the receiving end and the transmitting end of the optical waveguides, and driven by the micro-electric actuator. A surface layer is formed on the optical shutter, has reflectivity less than 80% so as to allow incident light beams to partially transmit thereinto, and further has a sufficient light extinction ratio, thereby extinguishing the partially transmitted light beams therein.

18 Claims, 7 Drawing Sheets

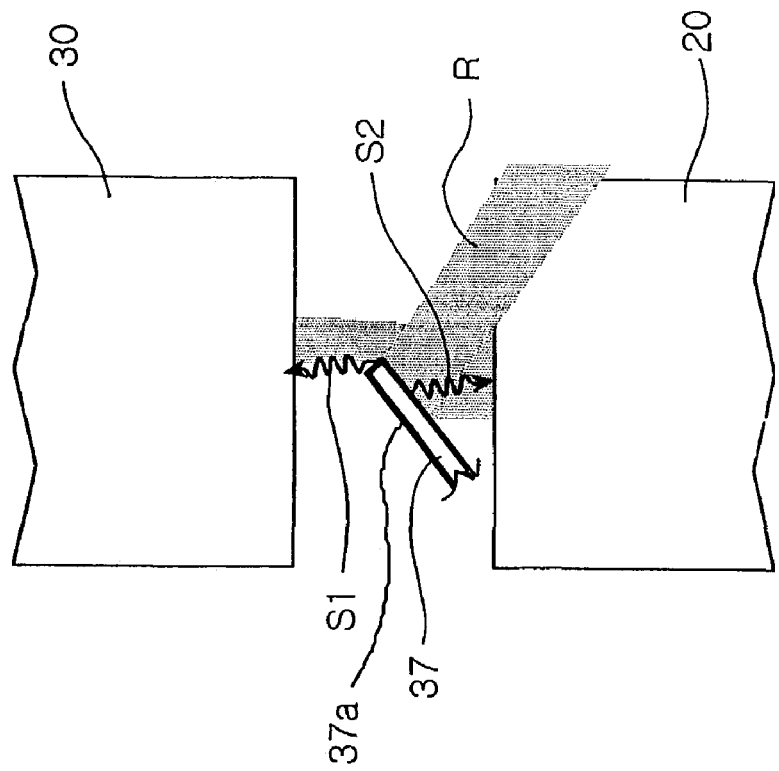
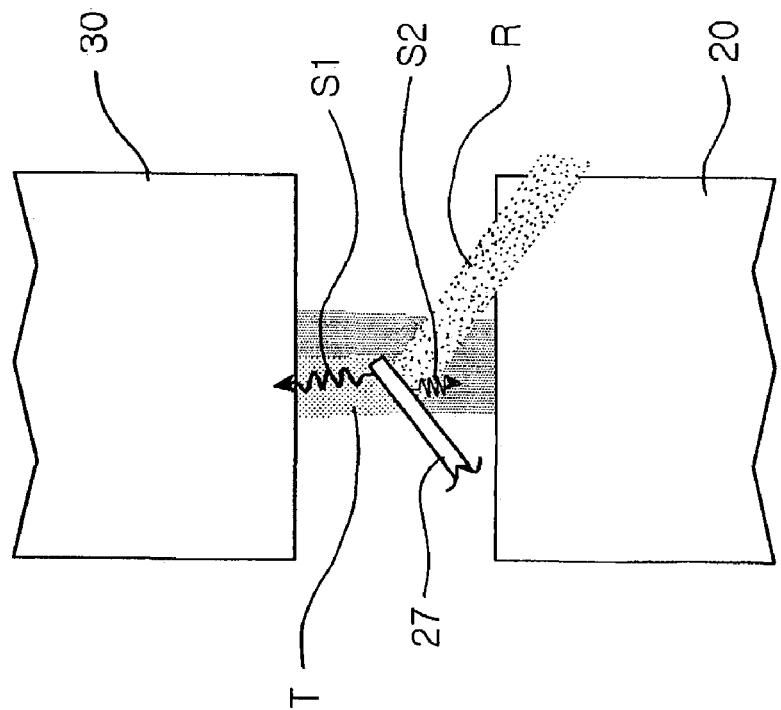
FIG. 2a PRIOR ART
FIG. 2b PRIOR ART

MICROELECTROMECHANICAL SYSTEMS (MEMS) VARIABLE OPTICAL ATTENUATOR

BACKGROUND OF THE INVENTION

1. Field of the Invention

The present invention relates to an optical attenuator that uses an element of a micro-electro-mechanical system (MEMS) device, and more particularly to an MEMS variable optical attenuator having an improved optical shutter for regulating optical power of an optical signal by partially intercepting incident light beams.

2. Description of the Related Art

An optical attenuator for use in optical telecommunication networks is an optical component for delivering beams of light passing out an exit end of an optical waveguide to an incident end of an optical waveguide by causing insertion loss to the light beams.

Generally, optical power levels are regulated over wide ranges based on a configuration of an optical telecommunication system. For example, the optical power levels are determined by an optical transmission loss typically varied based on a length of an optical transmission line, the number of connection points of optical fibers, and the number and performance of optical components such as optical couplers coupled to the optical transmission line. An optical attenuator is needed in optical telecommunication networks to reduce an optical power when an optical signal with an excessive power level greater than an allowed power level is received to an optical signal receiver. The optical attenuator further may be used in evaluating, adjusting and correcting telecommunication equipments and optical measurement equipments.

Such optical attenuators are classified into two types, a fixed optical attenuator for reducing an optical power by a fixed amount of attenuation and a variable optical attenuator (VOA) capable of attenuating an optical power by a varied amount of attenuation based on user's requirements. The optical attenuator is required to be produced at low cost with high reliability and small size.

To satisfy such requirements, an optical attenuator that uses an element of an MEMS device has been suggested. Such MEMS optical attenuator is realized by forming a microstructure acting as an actuator on a substrate such as silicon using thin film processing technology. Generally, an MEMS actuator is driven to move by a driving force caused by thermal expansion or an electrostatic force. As the MEMS actuator moves, an optical shutter coupled to the MEMS actuator is displaced so as to be inserted into a gap between two optical waveguides, thereby partially intercepting light beams traveling from a transmitting end (or the exit end) of the optical waveguide such as an optical fiber to a receiving end (or the incident end) of the optical waveguide.

FIG. 1 illustrates a perspective view of a conventional variable optical attenuator using an actuator driven by an electrostatic force. A variable, optical attenuator shown in FIG. 1 includes a substrate 11 with a pair of optical fibers having a transmitting end 20 and a receiving end 30, respectively, an electrostatic actuator comprised of driving electrodes 12a, 12b, a ground electrode 14, a, spring 15 and a movable mass 16, and an optical shutter 17 connected to the movable mass 16 of the electrostatic actuator.

The driving electrodes 12a, 12b and the ground electrode 14 are formed over the substrate 11 and supported by an oxide layer called an "anchor". The movable mass 16 is connected to the ground electrode 14 via the spring 15 and has a comb shape. The driving electrodes 12a, 12b have respective extended portions 13a, 13b, each with a comb shape. The comb of each of the extended portions 13a, 13b is interdigitated with the comb of the movable mass 16.

When driving signals are applied to the driving electrodes 12a, 12b so as to generate a potential difference between the driving electrodes 12a, 12b and the ground electrode 14, electrostatic force arises between the interdigitated combs of movable mass 16 and extended portions 13a, 13b, thereby driving the movable mass 16 to move. As the movable mass 16 moves, the optical shutter 17 is inserted into a gap defined by the transmitting end 20 and the receiving end 30 so as to partially intercept beams of light incident onto the optical shutter 17.

It is important for the variable optical attenuator to vary an amount of attenuation based on wavelengths of incident light beams.

Further, it is important for the variable optical attenuator to minimize variation of a power level of the attenuated light beams, such variation being caused by a disturbance such as time passing, wavelengths of the incident light beams, polarization change of the incident light beams and vibration.

However, a conventional variable optical attenuator is disadvantageous in that wavelength dependent loss (WDL) and polarization dependant loss (PDL) are great because the optical shutter has a flat panel shape.

FIGS. 2A and 2B illustrate schematic views of conventional optical shutters in accordance with the conventional art.

Referring to FIG. 2A, light beams traveling from the transmitting end 20 of an optical fiber to a receiving end 30 of an optical fiber are partially intercepted by an optical shutter 27. Here, the optical shutter 27 is formed of the same silicon material as a known actuator.

Of the light beams incident to the optical shutter 27, a great portion of light beams R is reflected by the optical shutter, so that entry of the reflected light R to the receiving end 30 is prevented. However, since the optical shutter 27 is made of silicon having high transmittance, a portion of the light beams T is allowed to be incident to the receiving end, 30 of the optical fiber through the optical shutter 27. Further, the light beams are scattered by reflection and therefore scattered lights S1, S2 are generated. Of the scattered lights, a portion S1 enters the receiving end 30 and the other portion S2 may be reflected back into the transmitting end 20. Accordingly, the conventional optical shutter 27 has a disadvantage of low light shutoff efficiency because the optical shutter 27 is made of silicon having high transmittance. Therefore, to solve a problem of low light shutoff efficiency of the optical shutter 27, an optical shutter coated with a reflective metal layer having high reflectivity (about 90%) is provided with reference to FIG. 2B. The reflective metal layer is formed of a material of Au, Ni, Cu, Al and Pt.

FIG. 2B illustrates an optical shutter 37 coated with a reflective metal layer 37a made of Au. The optical shutter 37 reflects almost of light beams R incident onto the optical shutter 37, so that few of light beams may be incident onto the receiving end 30 of the optical fiber.

However, the optical shutter 37 coated with the Au layer 37a generates scattered lights S1, S2, and the scattered lights S1, S2 enter the receiving end 30 and the transmitting end 20.

For example, in the case of attenuating light beams incident to the optical shutter coated with the Au layer to 50%, 49% of light beams R of the entire light beams passing out the transmitting end 20 may be intercepted by reflection from the Au layer on the optical shutter 37, but 1% of light beams are scattered and the scattered lights S1, S2 enter the receiving end 30 and reenter the transmitting end 20.

However, even though the scattered lights S1, S2 are few, reentry of the scattered lights S2 to the transmitting end 20 by back reflection increases. Further, the amount of the scattered lights S1, S2 is subtly changed based on wavelengths and polarization of the incident light beams. In the case that the scattered lights enter the receiving, end 30, WDL and PDL increase, thereby deteriorating attenuation reliability.

As described above, the conventional MEMS variable optical attenuator has a disadvantage of low reliability because an the amount of back reflected lights increases due to the low light shutoff efficiency of the optical shutter and because the WDL and PDL increase.

SUMMARY OF THE INVENTION

Therefore, the present invention has been made in view of the above problems, and it is an object of the present invention to provide an MEMS variable optical attenuator provided with an optical shutter coated with a surface layer which has characteristics of high reflectivity and transmittance, thereby preventing light beams from scattering and reducing the amount of back reflected light beams.

It is another object of the present invention to provide an MEMS variable optical attenuator provided with an optical shutter having a shape capable of refracting light beams transmitted into the optical shutter for preventing entry of the transmitted light beams to a receiving end of an optical fiber.

In accordance with one aspect of the present invention, the above and other objects can be accomplished by the provision of an MEMS variable optical attenuator comprising a substrate having a planar surface, a micro-electric actuator arranged on the planar surface of the substrate, a pair of optical waveguides having a receiving end and a transmitting end, respectively, and coaxially aligned with the other while being arranged on the planar surface, an optical shutter movable to a predetermined position between the receiving end and the transmitting end of the optical waveguides, and driven to move by the micro-electric actuator, and a surface layer formed on the optical shutter, having reflectivity less than 80% so as for incident light beams to partially transmit thereinto, and having an extinction ratio which is varied based on a thickness thereof, thereby extinguishing the partially transmitted light beams therein.

Preferably, the surface layer is formed of a material selected from the group comprising Ti, $TiO_2$, Cr, $CrO_2$, W, Te and Be.

Preferably, the surface layer is formed of a double layer comprising a first layer formed of a material selected from the group including Ti, Cr, W, Te and Be and a second layer formed of $TiO_2$ or $CrO_2$.

Preferably, the optical shutter has a flat panel shape and is arranged to be oblique relative to the transmitting end and the receiving end of optical fibers.

Preferably, the optical shutter has a first surface perpendicular to an optical axis of the receiving end of the optical waveguide and a second surface which is oblique with respect to the transmitting end of the optical waveguide with an inclination angle less than 90°.

Preferably, the optical shutter has a half wedge shape.

Preferably, the actuator includes an electrode section comprising a ground electrode fixed onto the substrate and driving electrodes, a spring arranged on the substrate and connected to the ground electrode at one end thereof, and a movable mass connected to the other end of the spring and arranged on the substrate to be movable toward the driving electrodes.

Preferably, the surface layer is formed of a material selected from the group comprising Ti, Cr, W, Te and Be, and the electrodes are coated with the same material as the surface layer.

In accordance with another aspect of the present invention, there is provided with an MEMS variable optical attenuator comprising a substrate having a planar upper surface, a micro-electric actuator arranged on the planar upper surface of the substrate, optical waveguides having a receiving and a transmitting end, respectively, and arranged on the upper surface of the substrate to be coaxially aligned with the other, and an optical shutter movable to a predetermined position between the receiving end and the transmitting end of the optical waveguides, wherein the optical shutter has a first surface perpendicular to an optical axis of the receiving end and a second surface being oblique with respect to the transmitting end of the optical waveguide with an inclination angle less than 90°.

Preferably, the optical shutter has a half wedge shape.

BRIEF DESCRIPTION OF THE DRAWINGS

The above and other objects, features and other advantages of the present.,invention will be more clearly understood from the following detailed description taken in conjunction with the accompanying drawings, in which:

FIGS. 2A and 2B illustrate schematic views of flat panel shape of optical shutters used in conventional MEMS variable optical attenuators;

DESCRIPTION OF THE PREFERRED EMBODIMENTS

A detailed description of an MEMS variable optical attenuator in accordance with preferred embodiments of the present invention will be given below with reference to the accompanying drawings.

Figure 1:
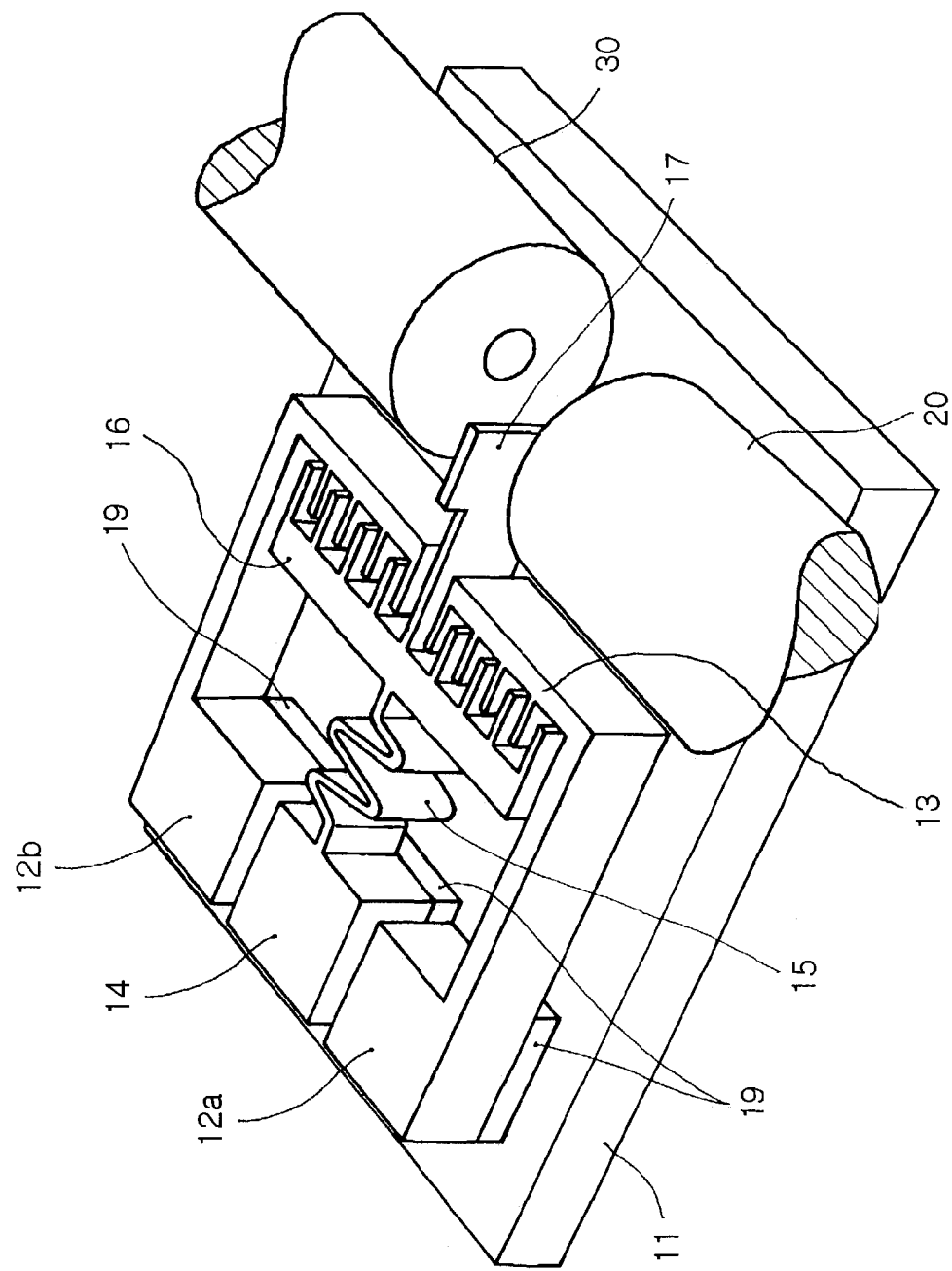
FIG. 1 illustrates a schematic perspective view of an optical attenuator in accordance with the conventional art.
Figure 3:
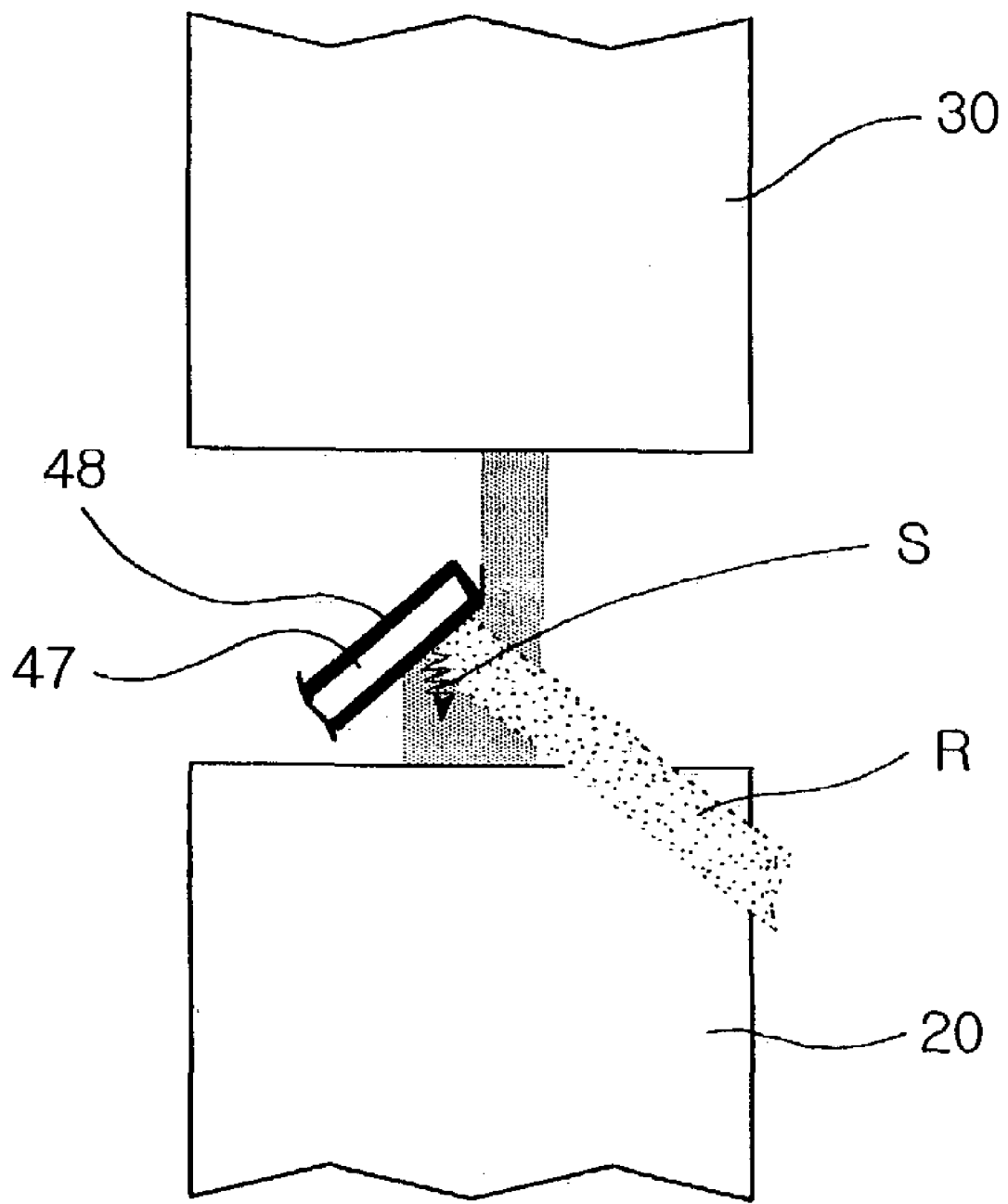
FIG. 3 illustrates a schematic view of an optical shutter used in an MEMS variable optical attenuator in accordance with one embodiment of the present invention, wherein the optical shutter is coated with a Ti layer.

FIG. 3 illustrates a schematic view of an optical shutter used in an MEMS variable optical attenuator in accordance with one embodiment of the present invention.

Referring to FIG. 3, the optical shutter 47 has a flat panel shape and is coated with a Ti layer 48. Light beams traveling from a transmitting end 20 of an optical fiber to a receiving end 30 of an optical fiber are partially intercepted by the flat panel shape of optical shutter 47.

The Ti layer 48 formed on the surface of the optical shutter 47 is a light permeable material, unlike Au which has a reflectivity of about 98% and is used as a coating layer in a conventional optical shutter. As compared with the reflectivity of Au, the Ti layer 48 has a reflectivity of about 60%. That is, a light transmittance of the Ti layer 48 is about 40%. The Ti layer 48 has a transmittance lower than that of silicon serving as a body of the optical shutter but has a characteristic of light extinction.

Accordingly, as shown in FIG. 3, when light beams are incident onto the optical shutter 47 coated with the Ti layer 48, a portion of the beams R is reflected by the Ti layer 48 formed on the optical shutter 47 so that the reflected lights R may not be incident onto the receiving end 30 of the optical fiber. Further, a portion of the light beams transmits into the Ti layer 48 and is extinct in the Ti layer 48. Accordingly, the transmitted lights into the Ti layer 48 may not be incident onto the receiving end 30 of the optical fiber as well.

Further, the Ti layer 48 has low reflectivity, unlike the Au layer used in the conventional optical shutter, so that light beams scattered by reflection are reduced in number.

Accordingly, by using the optical shutter coated with the Ti layer, reliability of the variable optical attenuator is improved because the wavelength dependence loss (WDL) and polarization dependence loss (PDL) proportional to the amount of the scattered lights decrease due to the reduced scattered light.

Since the optical shutter of this embodiment of the present invention is formed of silicon and Ti, both with high transmittance, light beams tend to be transmitted through the optical shutter. Accordingly, it is necessary to form the Ti layer to have a thickness capable of preventing the light beams from being transmitted through the optical shutter.

Assuming that intensity of entire light beams passing out the transmitting end 20 of the optical fiber is 100%, when the optical shutter 47 shown in. FIG. 3 moves to a predetermined position between the transmitting end 20 and the receiving end 30 for partially intercepting the light beams, 30% of the light beams are reflected from a surface of the Ti layer 48 formed on the optical shutter 47, and 20% of the light beams are transmitted into the Ti layer 48 and extinguished therein. Accordingly, the total amount of attenuation is 50%.

In the case of using the conventional optical shutter with Au coating layer, 49% of the entire incident light beams are reflected by the optical shutter. That is, 98% of the amount of attenuation is accomplished by reflection from the shutter.

However, in the case of using the optical shutter with the Ti layer 48 in accordance with the embodiment of the present invention, only 30% of the entire incident light beams are reflected. Accordingly, the amount of the scattered lights originating from the reflected light beams is reduced. Further, since the transmitted light beams are extinguished in the Ti layer 48, the scattered lights originating from the transmitted light beams may be extinguished as well. Therefore, the scattered lights caused by the reflection of the incident light beams and the back reflection of the transmitted light beams are reduced.

Consequently, since the amount of the scattered lights decreases, the WDL and PDL proportional to the amount of the scattered lights greatly decrease.

Instead of the Ti layer formed on the optical shutter for improving light shutoff efficiency of the optical shutter, a metal layer formed of a material selected from a group including Cr, W, Te and Be may be used. Further, $TiO_2$ or $CrO_2$ may be used for replacing the Ti layer because it has characteristics of light permeable and extinction. Further, the Ti layer may be replaced with a double layer comprised of a first layer formed of a metal selected from a group comprising Ti, Cr, W, Te and Be and a second layer of $TiO_2$ or $CrO_2$. The second layer is a surface layer formed on the first layer.

In table 1, desired materials for coating the optical shutter are shown. Ti, Cr, W and Te used as the coating layer of the optical shutter have a reflectivity less than 80%, thereby allowing light beams to partially transmit thereinto. The transmitted light beams are extinguished in the coating layer formed of Ti, Cr, W or Te because the coating layer has a light extinction characteristic. Table 1 shows the extinction ratio of light beams based on thickness of the coating layer. Metals shown in table 1 are able to lower a reflectivity of the optical shutter and extinguish the transmitted light therein by being coated on the optical shutter, thereby minimizing influence of the scattered light beams on the shutoff efficiency of the optical shutter and improving a shutoff characteristic of the optical shutter. In table 1, physical quantities are obtained assuming wavelength of the light beams is 1.5 μm which is a wavelength of light beams typically used in optical telecommunication.

TABLE 1

| Material | Refractive index of real number | Refractive index of imaginary number | Reflectivity | Extinction ratio (dB/nm) |
| --- | --- | --- | --- | --- |
| Ti | 4.04 | 3.82 | 0.596 | 0.139 |
| Cr | 4.13 | 5.03 | 0.680 | 0.183 |
| W | 2.36 | 4.61 | 0.710 | 0.168 |
| Te | 7.23 | 0.48 | 0.574 | 0.107 |

Further, since natural oxides or oxides of the materials in table 1 have the same characteristic as the materials in table 1, the natural oxides and oxides of the materials in table 1 may be used as the coating layer formed on the optical shutter instead of the Ti layer 48. Accordingly, TiO2 and. CrO2 may be used as the coating layer solely or together with the metals shown in table 1.

Figure 4:
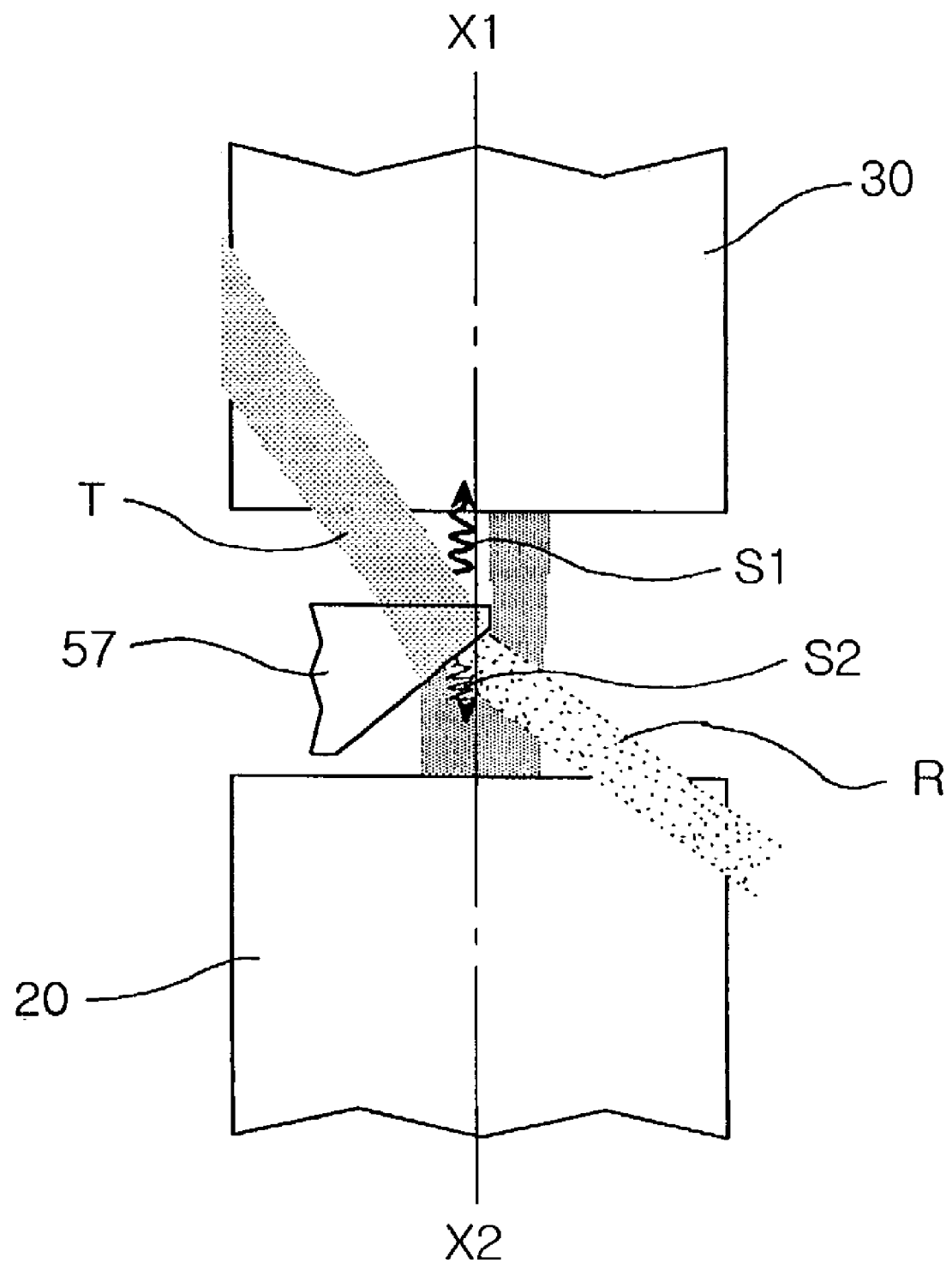
FIG. 4 illustrates a schematic view of a half wedge-shaped optical shutter of an MEMS variable optical attenuator in accordance with another embodiment of the present invention.

FIG. 4 is a schematic view of a half wedge-shaped optical shutter of a variable optical attenuator in accordance with another embodiment of the present invention.

In this embodiment, an optical shutter 57 has the same Au coating layer as the conventional optical shutter but has a different shape from the conventional optical shutter. Unlike the conventional optical shutter having a flat panel shape, the optical shutter in accordance with this embodiment of the present invention has a half wedge shape so that generation of the scattered light beams can be prevented and the light beams transmitted into the optical shutter cannot be incident onto the core region of the receiving end 30 of the optical fiber because the transmitted light beams are refracted at surfaces of the half wedge shaped optical shutter.

As shown in FIG. 4, the optical shutter 57 has a first surface perpendicular to an optical axis X1 of the receiving end 30 of the optical fiber and has a second surface oblique relative to the transmitting end 20 of the optical fiber.

An angle between the second surface of the optical shutter 57 and an optical axis X2 of the transmitting end 20 of the optical fiber are arbitrarily determined in the range of 0 to less than 90° as long as the light beams transmitted into the optical shutter 57 can be refracted at the second surface not to enter the core region of the receiving end 30 of the optical fiber.

FIG. 4 shows dispersion of light beams traveling from the transmitting end 20 of the optical fiber to the receiving end 30 of the optical fiber, wherein the light beams are partially intercepted by the half wedge-shaped optical shutter. The optical shutter is formed of silicon, the same as other actuators.

About 60% of light beams can transmit the silicon material serving as the body of the optical shutter. Accordingly, in the conventional optical attenuator, the optical shutter is coated with the Au layer having high reflectivity for preventing incident light beams from penetrating into the optical shutter and entering the receiving end of the optical fiber through the optical shutter. However, such conventional optical shutter with the Au coating layer causes a problem of deteriorating reliability of the variable optical attenuator by increasing the WDL and EPDL which are proportional to the amount of scattered light beams originating from the reflected lights and the back reflected light.

Accordingly, the present invention suggests the optical shutter without the reflective coating layer that generates scattered lights. The optical shutter of the present invention has a different shape from the conventional optical shutter, thereby preventing light beams from entering the receiving end 30 of the optical fiber by reflecting a portion of the incident light beams and refracting the light beams transmitted into the optical shutter.

Referring to FIG. 4, when light beams traveling from the transmitting end 20 of the optical fiber to the receiving end 30 of the optical fiber are incident onto the optical shutter 57, a portion of the light beams are reflected by the optical shutter 57, thereby being intercepted. Another portion of the light beams T is transmitted into the optical shutter 57, refracted at the second surface (or a slanted surface) of the optical shutter 57 and then refracted again at the first surface perpendicular to the optical axis of the receiving end 30 of the optical fiber, thereby being diverted from the core region of the receiving end of 30 the optical fiber 30. The transmitted light beams T are refracted at the second surface by an angle which is the same as the angle between the slanted surface of the optical shutter 57 and a light incident direction.

Accordingly, the half wedge-shaped optical shutter 57 shown in FIG. 4 does not generate scattered lights caused by reflection but only generates a small amount of scattered lights S1, S2 by surface roughness. Therefore, the WDL and PDL are greatly decreased.

Figure 5:
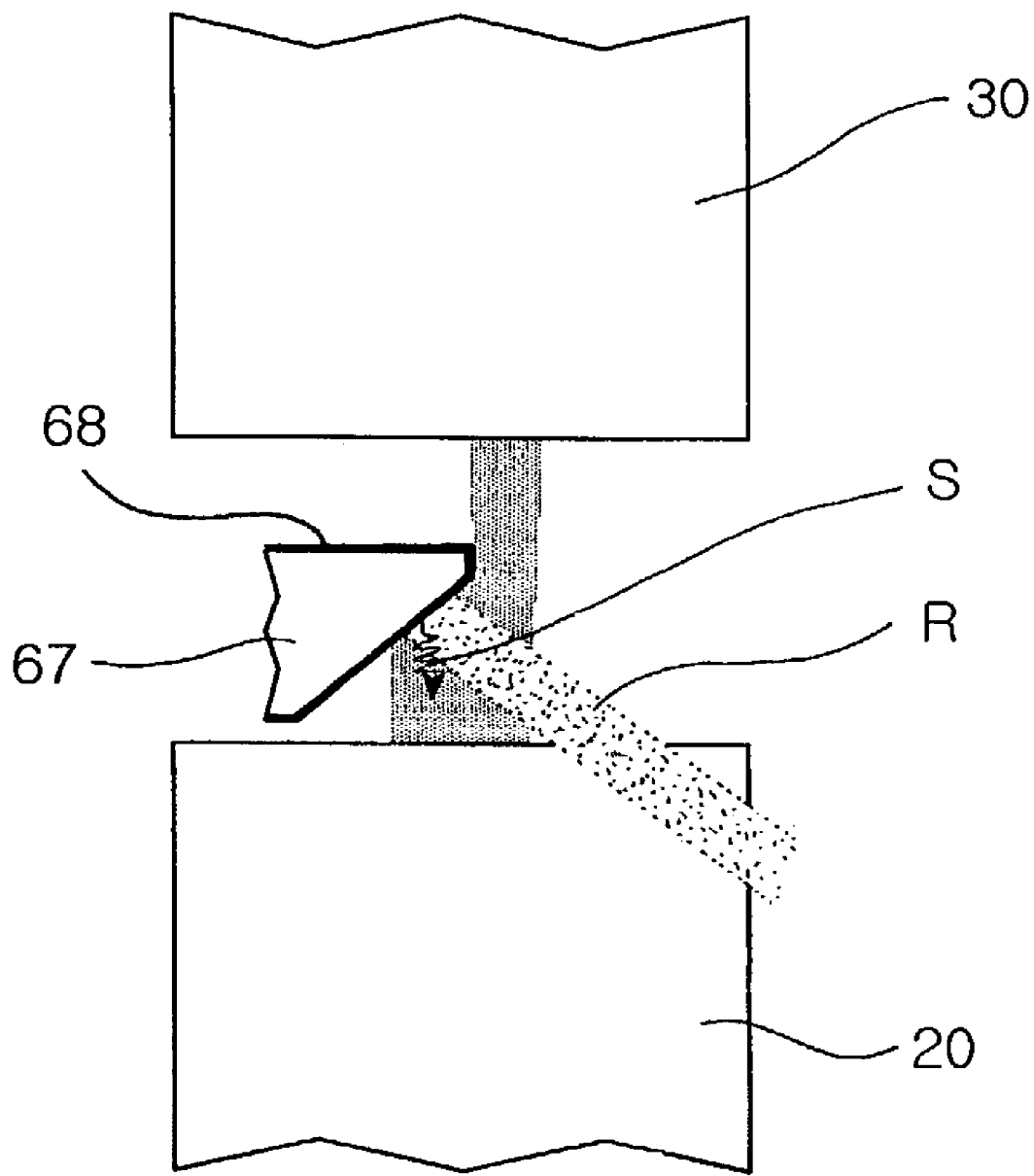
FIG. 5 illustrates a schematic view of an optical shutter of an MEMS variable optical attenuator in accordance with further another embodiment of the present invention.

Further, it is preferable to combine advantages of the optical shutter shown in FIG. 3 and advantages of the optical shutter shown in FIG. 4, thereby providing an optical shutter shown in FIG. 5.

FIG. 5 illustrates a half wedge-shaped optical shutter coated with a Ti layer. Referring to FIG. 5, when light beams traveling from a transmitting end 20 of an optical fiber to a receiving end 30 of an optical fiber are incident onto an optical shutter 67 with a Ti layer 68, a great proportion of the light beams R are intercepted by reflection in a similar way of the optical shutter shown in FIG. 4.

However, the optical shutter in accordance with the embodiment shown in FIG. 5 is different from the optical shutter in accordance with the embodiment of FIG. 4 in that the scattered light beams and the light beams transmitted into the optical shutter 67 are extinguished in the Ti coating layer 68. Accordingly, entry of the light beams into the receiving end 30 of the optical fiber is substantially prevented. Further, surface roughness of the optical shutter 67 is improved because the Ti layer 68 is coated on the optical shutter 67, so that the scattered lights are scarcely generated.

As described above, since the optical shutter 67 does not use an Au layer having a high reflectivity as a surface coating layer, amount of the scattered lights is greatly reduced. Accordingly, the WDL and PDL caused originating from the scattered lights decrease, and consequently reliability of the variable optical attenuator is improved.

Further, in this embodiment of FIG. 5, it is not necessary to rigorously limit a thickness of the Ti coating layer. That is, in the embodiment with reference to FIG. 3, it is necessary to eliminate all the light beams transmitted into the optical shutter by the Ti coating layer 48. Accordingly; the Ti coating layer 48 has to have a sufficient thickness for all the transmitted light beams to be extinguished therein. However, in the embodiment with reference to FIG. 5, since the optical shutter 67 has a wedge shape, the light beams transmitted into the optical shutter 67 are not directed to enter the receiving end 30 of the optical fiber by being refracted from the surfaces of the optical shutter 67. Accordingly, it is not necessary to rigorously limit a thickness of the Ti coating layer.

Accordingly, in the case of using the optical shutter shown in FIG. 5, since the amount of the scattered lights caused by reflection is reduced to a third of that caused by using the conventional Au coated optical shutter, and the transmitted lights are refracted at the surfaces of the optical shutter, entry of the scattered lights to the receiving end of the optical fiber is prevented.

Figure 6:
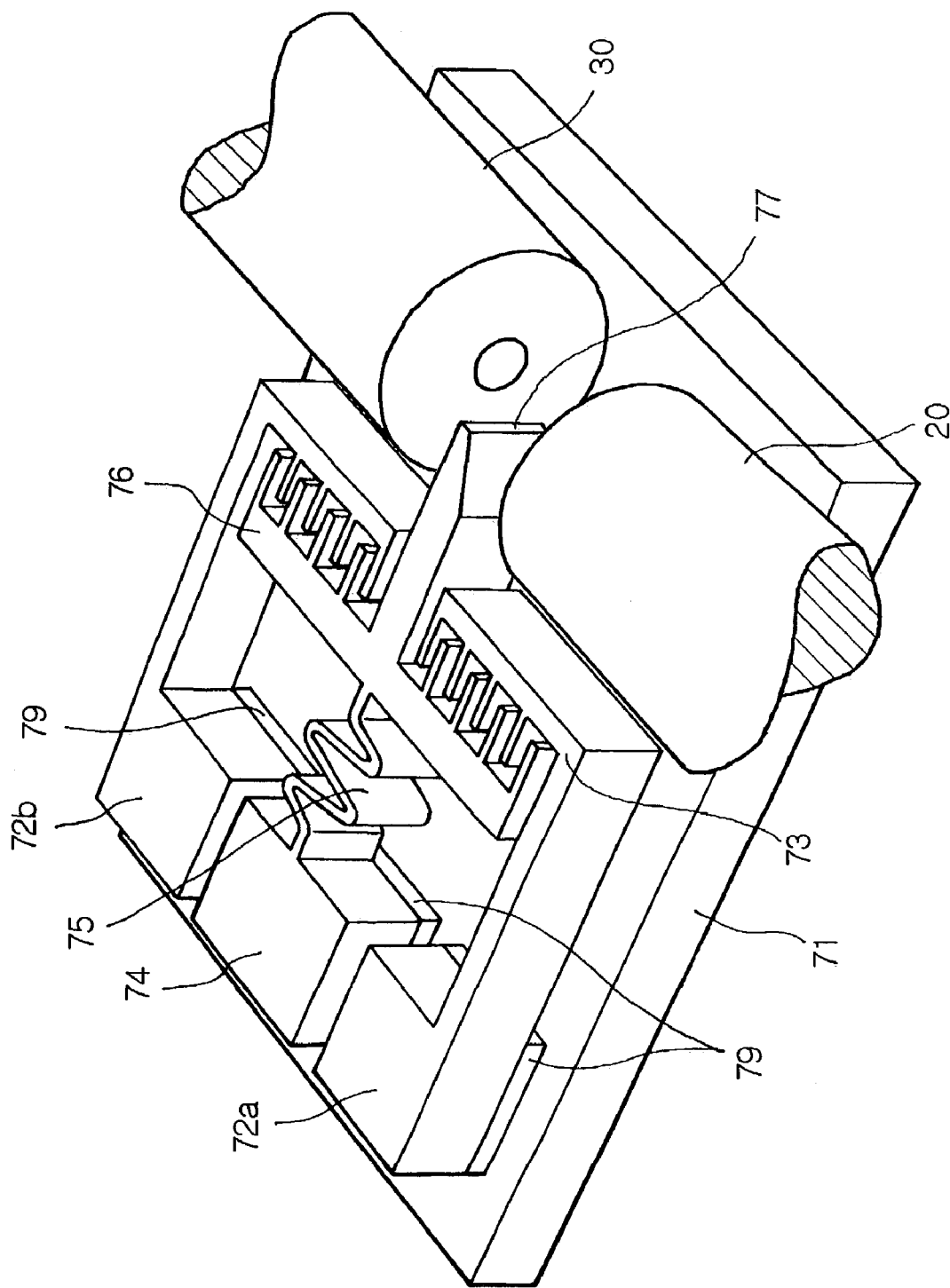
FIG. 6 illustrates a schematic perspective view of an MEMS variable optical shutter in accordance with the present invention.

FIG. 6 illustrates a schematic perspective view of an MEMS variable optical attenuator provided with an optical shutter in accordance with the embodiments of the present invention.

Referring to FIG. 6, an MEMS variable optical attenuator in accordance with the present invention includes a substrate 71 having optical waveguides, preferably optical fibers, having a transmitting end 20 and a receiving end 30, respectively, an electrostatic actuator comprising driving electrodes 72a, 72b, a ground electrode 74, a spring 75 and a movable mass 76, and an optical shutter 77 connected to the movable mass 76. The driving electrodes 72a, 72b and the ground electrode 74 are formed over the substrate 71 and supported by an oxide layer 79. The movable mass 76 is connected to the ground electrode 74 via the spring 75 at one end and suspended over the substrate 71. The spring 75 has an elastic structure and is formed of a material the same as the conventional actuators. The spring 75 has a curled structure with reference to FIG. 6, but is not limited thereto. The driving electrodes 72a, 72b have respective extended portions 73a, 73b, each with a comb shape. The comb of each of the extended portions 73a, 73b is interdigitated with the comb of the movable mass 76.

The optical shutter 77 has a half wedge shape with a slanted surface facing the receiving end of the optical waveguide. Further, a surface layer is preferably coated on the half wedge shaped optical shutter for improving a light shutoff efficiency of the optical shutter. The surface layer includes a Ti layer. Further, the electrodes, the driving electrodes and the ground electrodes, may be coated with a layer formed of the same material as the surface layer on the optical shutter. If the surface layer for coating the optical shutter and the layer for coating the electrodes are formed of the same material, the layer and the surface layer may be simultaneously formed during the same process step.

The optical shutter for use in the MEMS variable optical attenuator in accordance with the present invention is capable of minimizing influence of scattered light beams, thereby reducing the WDL and PDL proportional to the amount of the scattered lights and improving reliability of the optical shutter.

Figure 7A:
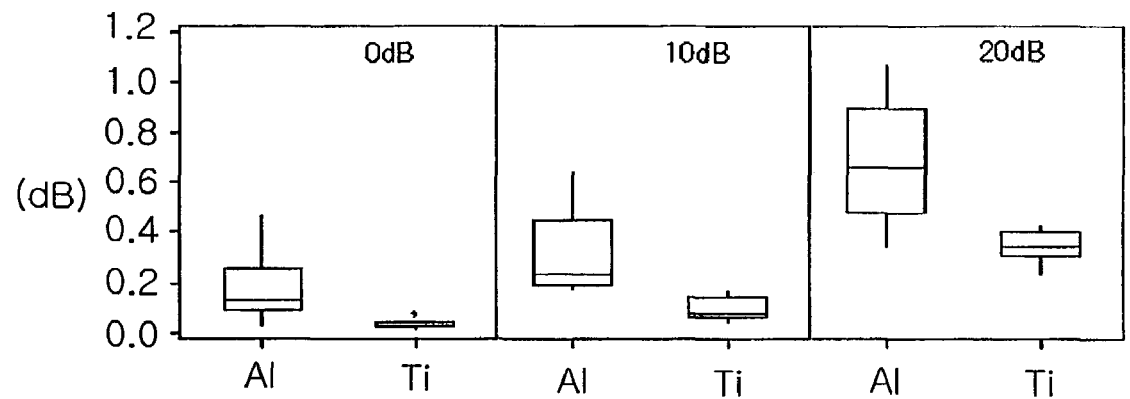
FIG. 7A illustrates a graph comparing wavelength dependence loss (WDL) of a conventional variable optical attenuator with WDL of a variable optical attenuator of the present invention.

FIG. 7A illustrates a graph comparing the WDL of the conventional optical shutter coated with a Au layer with that of the optical shutter coated with a Ti layer in accordance with the present invention. The WDL is measured in the cases where attenuation amounts are 0 dB, 10 dB and 20 dB, respectively. In the graph of FIG. 7A, the longitudinal axis indicates the amount of the WDL and bars indicate variation of the WDL amount.

Referring to FIG. 7A, in the case that attenuation amount is 0 dB, almost no variation of the WDL is caused by the optical shutter coated with the Ti layer, but the WDL ranging from 0.1 to 0.2 dB is measured in the optical shutter coated with the Au layer.

Further, in the case that attenuation amount is 10 dB, the WDL ranges from 0.1 to 0.2 dB in the conventional optical shutter coated with the Au layer, but is only 0.1 dB in the optical shutter of the present invention.

Still further, in the case that attenuation amount is 20 dB, the WDL ranges from 0.4 to 1 dB in the conventional optical shutter but is only 0.3 dB in the optical shutter of the present invention.

Figure 7B:
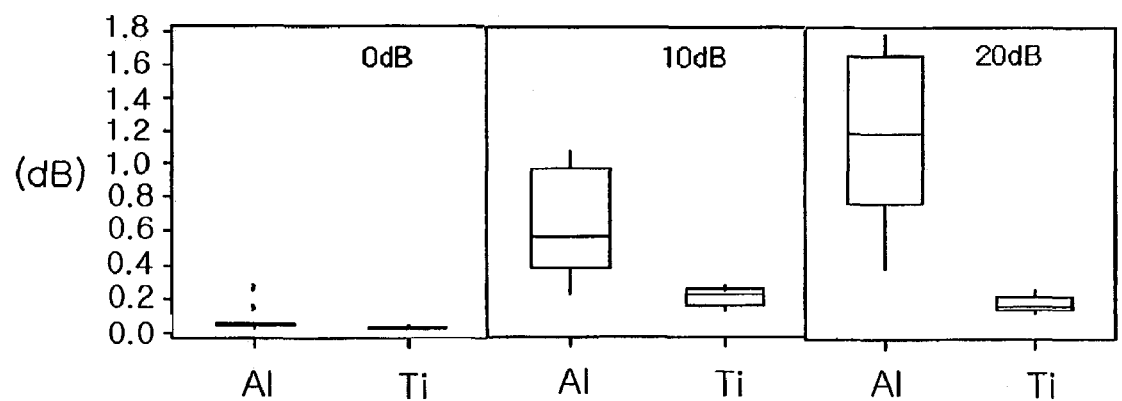
FIG. 7B illustrates a graph comparing a polarization dependence loss (PDL) of a conventional variable optical attenuator with PDL of a variable optical attenuator of the present invention.

On the other hand, the optical shutter of the present invention is superior to the conventional optical shutter in a characteristic of the PDL too. Referring to FIG. 7B, in the case that the attenuation amount is 0 dB, the PDL scarcely varies in the optical shutter of the present invention, which has a half wedge shape and Ti coating layer, and the convention optical shutter coated with the Au layer. However, in the case that the attenuation amount is 10 dB, the PDL ranges from 0.1 to 1 dB in the conventional optical shutter, but is only 0.2 dB in the optical shutter of the present invention. Further, in the case of the attenuation amount of 20 dB, the PDL ranges from 0.7 to 1.6 dB in the conventional optical shutter, but is only 0.2 dB in the optical shutter of the present invention.

As described above, the variable optical attenuator with the optical shutter in accordance with the embodiments of the present invention is capable of minimizing variation of the light intensity of the attenuated light beams by suppressing generation of the scattered lights.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A micro-electro-mechanical system (MEMS) variable optical attenuator, comprising:
    a substrate having a planar surface;
    a micro-electric actuator arranged on the planar surface of the substrate;
    a first optical waveguide having a receiving end and a second optical waveguide having a transmitting end, said optical waveguides being coaxially arranged on the planar surface;
    an optical shutter driven by the micro-electro actuator and movable to a predetermined position between the receiving end and the transmitting end of the optical waveguides; and
    a surface layer formed on the optical shutter;
    wherein
    said surface layer has a reflectivity less than 80% so as to allow transmission of a portion of incident light into said surface layer;
    said surface layer further has a light extinction ratio and a thickness for extinguishing the transmitted portion of said incident light in said surface layer; and
    the surface layer is formed of a material selected from the group consisting of Ti, $TiO_2$, Cr, $CrO_2$, W, Te and Be.

2. The attenuator as set forth in claim 1, wherein the optical shutter is a flat panel arranged obliquely with respect to an optical axis of said optical waveguides.

3. The attenuator as set forth in claim 1, wherein the optical shutter has a first surface perpendicular to an optical axis of the optical waveguides, and a second surface inclined at an angle less than 90° relative to said optical axis.

4. The attenuator as set forth in claim 3, wherein the optical shutter has a half wedge shape.

5. The attenuator as set forth in claim 1, wherein the actuator includes:
    an electrode section comprising a ground electrode fixed onto the substrate and driving electrodes;
    a spring arranged on the substrate and connected to the ground electrode at one end thereof; and
    a movable mass connected to the other end of the spring and arranged on the substrate to be movable toward the driving electrodes.

6. The attenuator as set forth in claim 5, wherein the surface layer is formed of a material selected from the group consisting of Ti, Cr, W, Te and Be, and the electrodes are coated with the same material as the surface layer.

7. The attenuator as set forth in claim 1, wherein the surface layer is formed of a double layer comprising a first layer formed of a material selected from the group consisting of Ti, Cr, W, Te and Be, and a second layer formed of $TiO_2$ or $CrO_2$.

8. The attenuator as set forth in claim 1, wherein said optical shutter has two opposite surfaces facing toward the receiving end and the transmitting end, respectively, and said surface layer is coated on both said opposite surfaces of said optical shutter.

9. The attenuator as set forth in claim 1, wherein the surface layer is formed of a material selected from the group consisting of $CrO_2$, W, Te and Be.

10. A micro-electro-mechanical system (MEMS) variable optical attenuator, comprising:
    a substrate having a planar surface;
    a micro-electric actuator arranged on the planar surface of the substrate;
    a first optical waveguide having a receiving end and a second optical waveguide having a transmitting end, said optical waveguides being coaxially arranged on the planar surface;
    an optical shutter driven by the micro-electro actuator and movable to a predetermined position between the receiving end and the transmitting end of the optical waveguides; and
    a surface layer formed on the optical shutter;
    wherein
    said surface layer has a reflectivity less than 80% so as to allow transmission of a portion of incident light into said surface layer;
    said surface layer further has a light extinction ratio and a thickness for extinguishing the transmitted portion of said incident light in said surface layer; and the surface layer is formed of a double layer comprising a first layer formed of a material selected from the group consisting of Ti, Cr, W, Te and Be, and a second layer formed of $TiO_2$ or $CrO_2$.

11. The attenuator as set forth in claim 10, wherein the optical shutter is a flat panel arranged obliquely with respect to an optical axis of said optical waveguides.

12. The attenuator as set forth in claim 10, wherein the optical shutter has a first surface perpendicular to an optical axis of the optical waveguides, and a second surface inclined at an angle less than 90° relative to said optical axis.

13. The attenuator as set forth in claim 12, wherein the optical shutter has a half wedge shape.

14. The attenuator as set forth in claim 10, wherein the actuator includes:

an electrode section comprising a ground electrode fixed onto the substrate and driving electrodes;

a spring arranged on the substrate and connected to the ground electrode at one end thereof; and a movable mass connected to the other end of the spring and arranged on the substrate to be movable toward the driving electrodes.

15. The attenuator as set forth in claim 10, wherein said optical shutter has two opposite surfaces facing toward the receiving end and the transmitting end, respectively, and said surface layer is coated on both said opposite surfaces of said optical shutter.

16. The attenuator as set forth in claim 10, wherein the first layer is formed of a material selected from the group consisting of W, Te and Be.

17. The attenuator as set forth in claim 10, wherein the second layer is formed of $CrO_2$.

18. The attenuator as set forth in claim 10, wherein the first layer is formed of a material selected from the group consisting of W, Te and Be, and the second layer is formed of $CrO_2$.

* * * * *